United States Patent [19]

Szarka et al.

[11] 4,388,806
[45] Jun. 21, 1983

[54] HYDRO-PNEUMATIC OPERATING DEVICE ACTUATED WITH A PNEUMATIC PRESSURE-MEDIUM OR SERVO-OPERATION, IN PARTICULAR FOR MOTOR-VEHICLE CLUTCHES

[75] Inventors: István Szarka; János Urbantsok, both of Budapest, Hungary

[73] Assignee: Autoipari Kutato es Fejleszto Vallalat, Budapest, Hungary

[21] Appl. No.: 162,676

[22] Filed: Jun. 24, 1980

[30] Foreign Application Priority Data

Jun. 29, 1979 [HU] Hungary ................... AU 426

[51] Int. Cl.³ .................................. B60T 13/00
[52] U.S. Cl. .............................. 60/547.1; 60/581; 91/519
[58] Field of Search ............. 60/547 R, 548, 581, 60/582; 91/519

[56] References Cited

U.S. PATENT DOCUMENTS

| 3,083,694 | 4/1963 | Schanz | 91/519 |
| 3,115,067 | 12/1963 | Ayers, Jr. | 60/547 |
| 4,096,696 | 6/1978 | van House | 60/547 |
| 4,107,926 | 8/1978 | Adachi | 60/581 |
| 4,170,876 | 10/1979 | Dits | 60/547 R |
| 4,199,940 | 4/1980 | Mathues | 60/547 R |
| 4,244,185 | 1/1981 | Belart | 60/581 |
| 4,244,186 | 1/1981 | Mehren | 60/547 R |
| 4,313,302 | 2/1982 | Farr | 60/547 R |

FOREIGN PATENT DOCUMENTS 2104934 8/1972 Fed. Rep. of Germany .

Primary Examiner—Abraham Hershkovitz
Attorney, Agent, or Firm—Young & Thompson

[57] ABSTRACT

A hydro-pneumatic operating device for motor vehicle clutches permits shifting into second or higher gears without operation of the clutch pedal, by manipulation of an electric switch that actuates an electro-pneumatic valve. A cylinder block 31 is provided that houses a hydraulic working cylinder having a hydraulic piston of a hydro-pneumatic piston, and a pneumatic servo-valve unit whose path control is actuated by an external operating element which cooperates with a pneumatic servo-piston (14) of the hydro-pneumatic piston (20). On an end face of the pneumatic servo-piston (14) opposite a pneumatic servo-chamber (11) there is a supporting surface 19 whose countersurface 118 is formed on the pneumatic servo-piston (20a) of the hydro-pneumatic piston 20. The other side of pneumatic servo-piston 20a confines a blow-off chamber 22. A cylinder section 13 of a pneumatic working chamber 15 enclosed by the hydraulic pneumatic piston 20 and the pneumatic servo-piston 14 has a connection 66 for pressure medium. The hydro-pneumatic piston 20 has a duct 46 leading to blow-off chamber 22, which chamber 22 has a blow-off unit 47 discharging to the free atmosphere. An axial bore 51 leading to duct 46 has a shaft 50 with a longitudinal through channel 49 communicating with a blow-off chamber 119 of the path controlling servo-valve unit.

2 Claims, 4 Drawing Figures

HYDRO-PNEUMATIC OPERATING DEVICE ACTUATED WITH A PNEUMATIC PRESSURE-MEDIUM OR SERVO-OPERATION, IN PARTICULAR FOR MOTOR-VEHICLE CLUTCHES

The invention relates to a hydro-pneumatic operating device actuated with a pneumatic pressure-medium or servo-operation, in particular for motor-vehicle clutches provided with a friction insert. The operating device is suitable to be incorporated into a clutch-release device, in which when starting the vehicle the clutch is operated by a pedal and when changing into second or higher gears, the clutch-release device is actuated by means of an electric circuit of an electric switch built into a gear-shift lever, through an electro-pneumatic valve.

There are known operating devices for clutches in which, when changing into second or higher gears, the circuit of the electric switch built into the gear-shift lever brings an automatic clutch-release device into operation without actuating the clutch pedal. In these devices the clutch pedal has to be operated only when starting or shifting into first gear. Such a device has been described e.g. in the patent publication No. 2,104,934 of the Federal Republic of Germany. According to this, the clutch is automatically operated by an electro-hydraulic system. The clutch can be operated by a pedal via a clutch-releasing working cylinder, connected by ducting to a hydraulic working cylinder fitted to the pedal, wherein an electric switch fitted to the pedal disables the automatic electro-hydraulic system.

The electro-hydraulic system consists of an electro-hydraulic valve fitted in the ducting that connects the two working cylinders, a feed pump, an electro-hydraulic control valve and a controlling/evaluating unit. The mechanism ensures both quick release of the clutch on gear change and gradual engagement at a predefined speed of the clutch, thus achieving the required clutch slip.

This object of the invention is to provide a hydro-pneumatic device (i.e. a system of valves) which, when connected to the circuit of an electric switch built into the gear-shift lever and by means of an electro-pneumatic valve inserted inbetween, is able to release and engage the clutch without actuating the clutch pedal and simultaneously—similarly to the known servo-operated means—actuation by the clutch pedal is also possible.

Invention is an improvement of the operating device operated with a pneumatic pressure-medium or in a servo-operation, in particular for a motor-vehicle clutch, provided with a frictional insert. In the cylinder block of said operating device there is a hydraulic working cylinder connected to the pressure-medium, wherein the working piston section of the hydro-pneumatic piston is arranged; a servo-valve unit with pneumatic path control, actuated by an external operating element co-operates with the pneumatic servo-piston; on the end surface of the servo-piston opposite its working space a supporting surface is formed, the counter-surface of which is formed on the pneumatic working piston part of the hydro-pneumatic piston; the other side of the pneumatic working piston part confines a blow-off space, while in the cylinder section of the pneumatic working space enclosed by the pneumatic working cylinder and the pneumatic servo-piston there is a connection to the pressure-medium; in the hydro-pneumatic piston a channel is formed leading to the blow-off space provided with the blow-off unit discharging to the free atmosphere, into the axial section of which a telescoping shaft—formed with a longitudinal through-channel and communicating with the blow-off unit of the path controlling servo-valve unit—intrudes in a telescopic manner.

A preferred embodiment is suggested, wherein in the axial through-bore of the hydro-pneumatic piston there is a sealed displaceable piston-insert, the extreme position of which is limited by a buffer element fixed in the hydro-pneumatic piston. Between the piston-insert and the hydro-pneumatic piston there is a compression spring, which presses the piston-insert towards the buffer element. The telescopic shaft of the blow-off unit of the servo-valve intrudes in a telescopic and sealed manner into the bore of the piston-insert. The bore of the piston-insert continuously communicates through its transverse channel with the channel leading into the blow-off space of the pneumatic piston, while between the pneumatic working piston and the end face of the cylinder block is a compression spring arranged. The cylinder block is communicating with the feed liquid, which again is connected to the wall-perforation of the hydro-pneumatic piston via the channel. Said wall-perforation is connected to the feed channel in the piston-insert, at the end of the feed channel leading to the hydraulic working space the valve seat is formed, on which is a check valve closing in the direction of the feed channel.

In a further preferred embodiment of the invention the pneumatic working space enclosed by the pneumatic servo-piston and the pneumatic working piston is connected to the pressure-medium by means of a duct of a two-position three-way electro-pneumatic valve, while the blow-off duct is connected to an expansion tank of the retarding blow-off unit, whereas the expansion tank is formed with a throttle communicating with the free atmosphere.

In another preferred embodiment of the invention the blow-off duct of the electro-pneumatic valve is provided with a pressure limiting valve and a throttle connected in parallel to the pressure limiting valve, and the expansion chamber is connected in series with the two previous elements having a throttle aperture communicating with the free atmosphere.

In a further preferred embodiment of the invention the valve-piston forming the housing of the servo-valve unit is led in a sealed and displaceable manner both in the servo-piston and in the cylinder block cover and an outer actuating element bears on the closing plug. The inner space of the valve-piston continuously communicates through a wall-perforation with the channel leading to the connection of the pressure medium, arranged in the cover. The inner inlet space of the valve-piston is separated from the transfer-space by means of a movable valve-seat ring and a double-valve fitted into said valve-seat. Between the plug and the valve-seat ring and the double-valve there is a compression spring. The valve-piston is formed with longitudinal notches carrying toggles fixed to a servo-piston, while the blow-off valve seat—led in a sealed manner in the valve-piston—bears on the toggle; one of the end faces of the double-valve is fitted to said valve-seat; between the blow-off valve-seat and the valve-seat ring there is a compression spring; the transfer space of the valve-piston continuously communicates with the servo working space between the pneumatic servo-piston and the cover through the wall-perforation, furthermore the duct of the blow-off valve-seat continuously communicates with the duct of the telescopic shaft. On the cover there is a pedal for disengaging the clutch, which remains in driving connection with the external actuating element bearing on the closing plug.

The invention is described in detail by way of preferred embodiments with the aid of the accompanying drawings, wherein.

Figure 1:
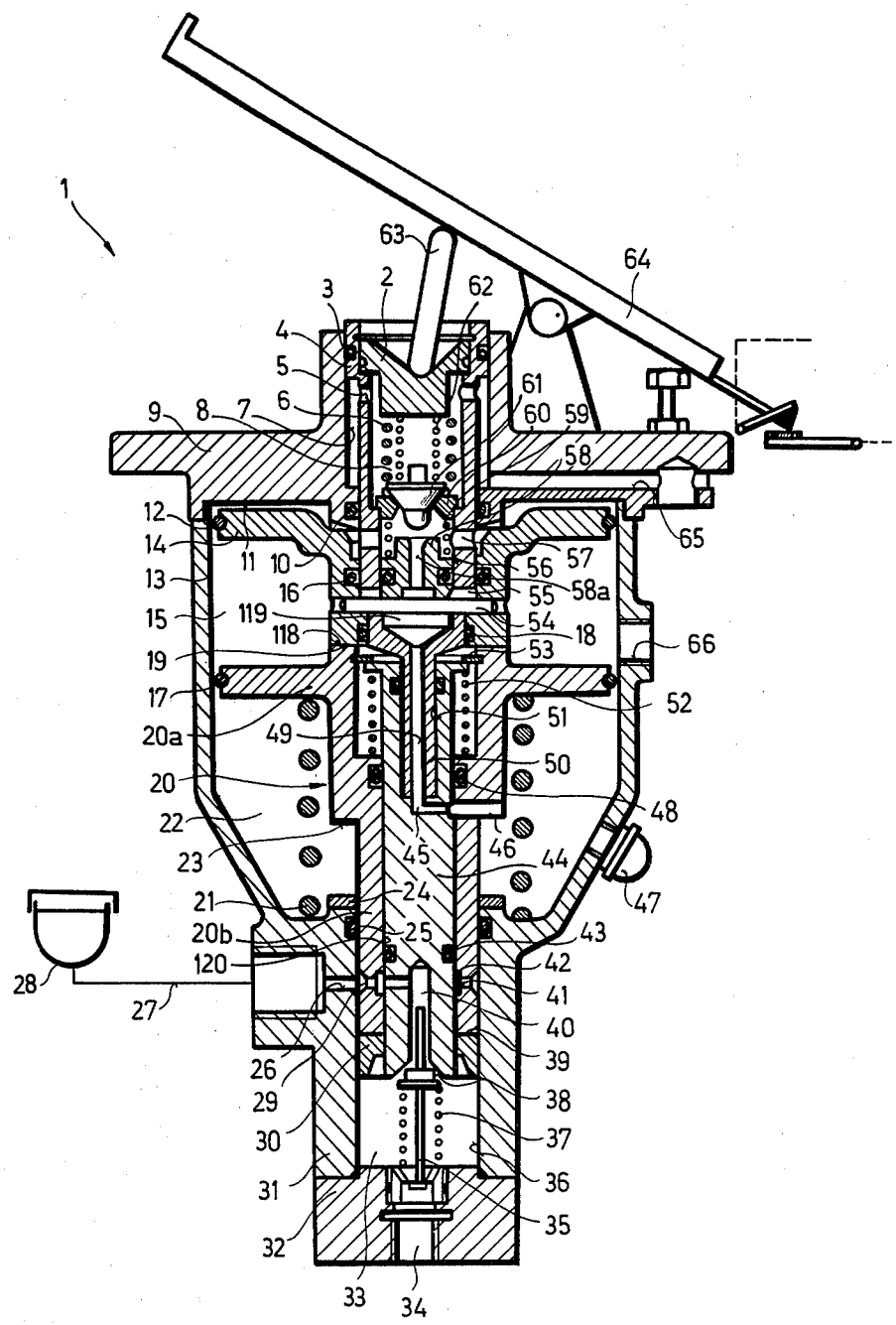
FIG. 1 is a schematic layout of the hydro-pneumatic actuating device according to the invention.

In FIG. 1 is illustrated the hydro-pneumatic operating device 1 provided with a foot pedal 64 and serving for the release of the clutch (not illustrated).

On a cover 9 of a cylinder block 31 is arranged the clutch actuating pedal 64 bearing on a closing plug 2 of a valve-piston 4 via an outer actuating element 63. The valve-piston 4 gasketed with gaskets 3 and 10 is fitting into the cover 9. A duct 65 leading to an annular space 7 between the gaskets 3 and 10 forms the inlet duct for the pressure-medium. The valve-piston 4—gasketed by gaskets 16 and 18—fits in a sealed manner in a second pneumatic servo-piston 14, which again fits-sealed by a gasket 12—into a bore 13 of the cylinder block 31. The cover 9 and the second pneumatic servo-piston 14 enclose a servo-chamber 11.

In its rest position, an end face 19 of the second pneumatic servo-piston 14 bears on an end face 118 of a first pneumatic servo-piston 20a of the hydro-pneumatic working piston 20, which is fitted—sealed by gaskets 17 and 25, respectively—into the bores 13 and 36 of the cylinder block 31.

Between the hydro-pneumatic working piston 20 and the cylinder block 31 is a compression spring 21 which continuously forces the hydro-pneumatic working piston 20 in the direction of its basic rest position. The hydro-pneumatic working piston 20 and the cylinder block 31 enclose a pneumatic blow-off chamber 22 communicating with the free atmosphere via air-filter 47. The displacement of the hydropneumatic working piston 20 is defined by a limiting ring 24 arranged in the cylinder block 31. In its extreme position the limiting ring 24 bears on an end face 23 of the hydro-pneumatic working piston 20.

The bore 36 of the cylinder block 31 is closed by a lower cover 32 incorporating a duct 34 connected to the hydraulic circuit. The bore 36, the lower cover 32, as well as a gasket 30 bearing on the end face 39 of the hydro-pneumatic piston 20, which thus constitutes a hydraulic servo-piston 20b of hydraulic-pneumatic piston 20, and also a piston-insert 44 sealed by gaskets 43 and 48 enclose a hydraulic chamber 33.

In the piston-insert 44 a fluid duct 40 leads to a valve-seat 38. A check-valve 35 loaded by a spring 37 fits on said valve-seat 38. The fluid duct 40 communicates with the inner annular space in the hydro-pneumatic piston 20, as well as with a duct 41 discharging into the same and starting from an outer annular space 29. A fluid duct 26 of the cylinder block 31 establishes a connection between the outer annular space 29 and a fluid tank 28 via pipeline 27.

In its rest position, under the influence of the force of a coil compression spring 52, the piston-insert 44 bears on a spring ring 53 arranged in the hydro-pneumatic working piston 20. A shaft 50 of the valve piston 4 incorporating a duct 49 intrudes in a sealed and telescopic manner into a bore 51 of the piston-insert 44. A duct 45 of the piston-insert 44 establishes a connection between the duct 49 of the valve-piston 4 and a duct 46 discharging into the blow-off space 22 of the hydro-pneumatic piston 20.

A pin 54, fixed in the pneumatic servo-piston 14, is led through openings 55 of the valve-piston 4; under the influence of the force of a coil compression spring 59, a valve-seat 58 incorporating a duct 58a and slidable in a sealed manner in a space 56 bears in its rest position on the pin 54. In the same space 56 there is a double-spring loaded ring-valve-seat 60, on which seats a valve 61 loaded with a spring 62. Between the ring-valve-seat 60 and the closing plug 2 is a coil compression spring 6. The distributing space 56 of the valve-piston 4 is connected to the pneumatic servo-working space 11 via duct 57, while a further duct 5 connects an upper air space 8 with the annular space 7. The pneumatic servo-piston 14 and the hydro-pneumatic working piston 20 enclose a pneumatic working space 15 having a connection 66 to the pressure-medium. Pressure applied to working space 15, however, does not act on the upper surface of piston 14, because chamber 11 and space 14 are sealed from each other.

Figure 4:
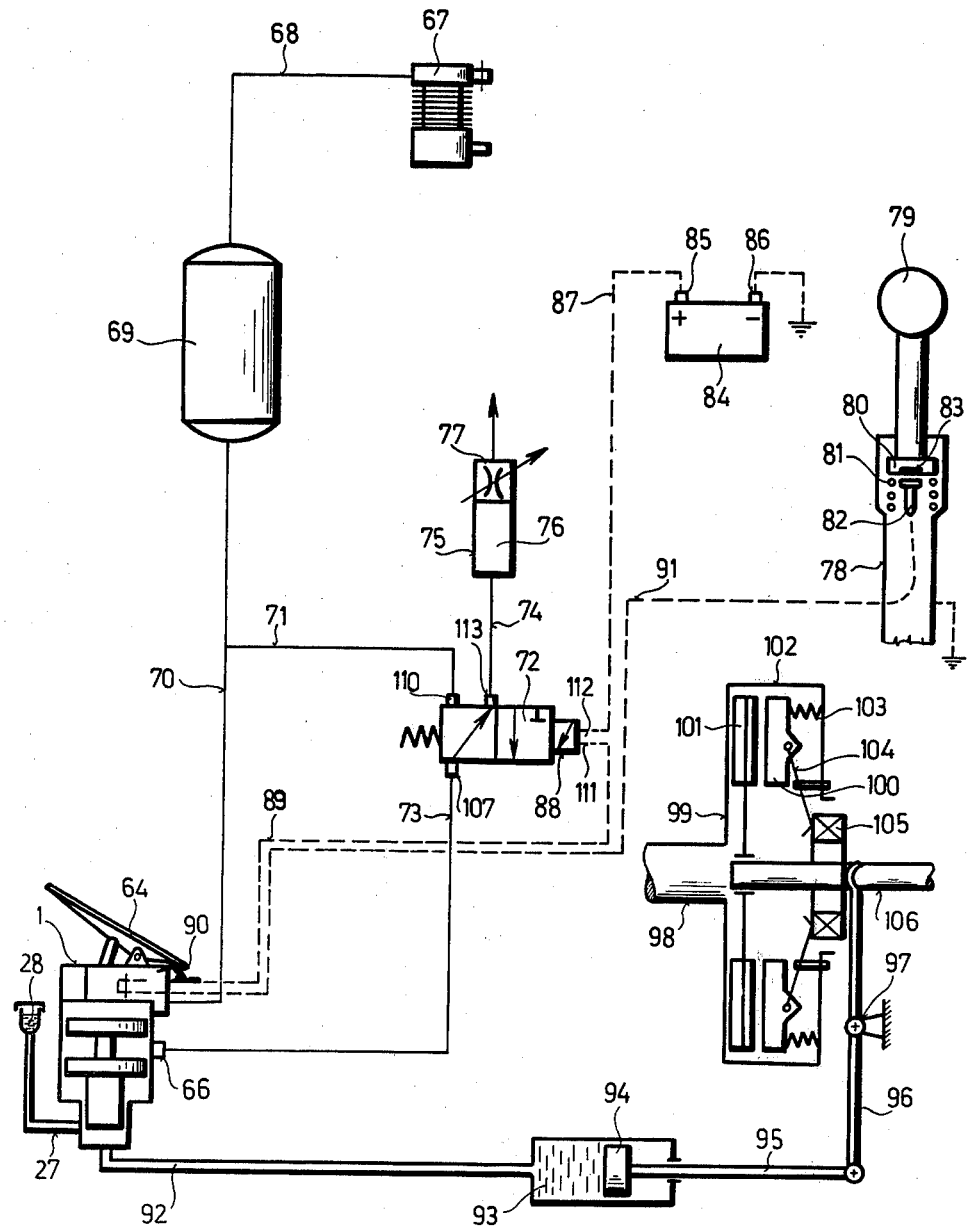
FIG. 4 shows the arrangement of the actuating device according to the invention, when connected respectively to an electrically controlled hydro-pneumatic circuit and a hydro-pneumatic circuit actuating the clutch.

In the arrangement shown in FIG. 4 the duct 65 (FIG. 1) leads to a pressure conduit 70, whereas the connection 66 connects with a pneumatic conduit 73 and the pressure-medium connection comprised by duct 34 is connected to a pipeline 92 of the hydraulic circuit.

The hydro-pneumatic actuating device 1 illustrated in FIG. 1 operates as follows:

To start the motor-vehicle when stationary, the driver has to press down the clutch actuating pedal 64, whereby the valve-piston 4 is displaced via the pressure shaft 63 and the closing plug 2. The valve-piston 4 displaces the piston-insert 44, as a consequence, the check-valve 35 bears on the valve-seat 38 and closes the hydraulic space 33. Simultaneously, by compressing the spring 59, the valve 61 is seated on the valve-seat 58 and separates the working space 11 from the blow-off space 22. By a further displacement of the pedal 64, the valve-seat 58 raises the valve 61 from the ring-valve-seat 60 against the action of spring 62, accordingly, in the air duct 65, via the annular space 7, the duct 5, the upper air-space 8, the ring-valve-seat 60 and the duct 57, compressed air flows to the working space 11 and displaces the servo-piston 14 a distance proportional to the displacement of the pedal 64.

By its surface 19 the piston 14 contacts the hydro-pneumatic working piston 20 and causes the movement of the hydro-pneumatic working piston 20 against the action of spring 21; now the hydraulic fluid—enclosed in the space 33—is allowed to flow through the connecting duct 34 into the working cylinder of the clutch (not illustrated here). In the course of this process the air leaves the space 22 and is discharged via the air-filter 47 to the free atmosphere.

Upon depression of the pedal 64 the piston-insert 44 is put into motion against the influence of the spring 52 and displaces the valve-piston 4, as a consequence, the valve 61 is raised from the valve-seat 58 and opens the servo-working space 11, and the air flows through the ducts 57, 58a, 49, 46 into the blow-off space 22 and proceeds via the air-filter 47 into the free atmosphere. Simultaneously the valve 61 is seated on the annular valve-seat 60 and closes the path of the compressed air. When the valve-piston 4 returns to its rest position, the check-valve 35 opens and the connection between the fluid space 33 and the tank 28 is established via the ducts 40, 41, 42, 29, 26 and the pipeline 27.

When operated with air, that is, without actuation of pedal 64, compressed air flows through the connection 66 to the working space 15. Under the influence of the compressive force of the air the hydro-pneumatic working piston 20 moves against the spring 21, while the servo-piston 14 does not move. Now the check-valve 35 is seated on the seat 38 and closes the space 33. Under the influence of the further displacement of the working piston 20 the hydraulic fluid flows from the space 33 through the duct 34 to the working cylinder of the clutch (not illustrated here), in the meantime the air is discharged into the atmosphere through the air-filter 47. The extreme position of the working piston 20 is defined by the limiting ring 24. When the supply of compressed air to the working space 15 stops, the hydro-pneumatic working piston 20 is displaced under the effect of the spring 21 and the hydraulic fluid contained in the space 33, while the air contained in the space 15 is discharged via the connection 66 under control of a control valve connected thereto but not illustrated here.

Into the space 22 air flows from the atmosphere through the air-filter 47. In the rest position of the hydro-pneumatic working piston 20 the check-valve 35 is open, as a consequence a connection between the hydraulic fluid contained in the space 33 and the tank 28 will be established via the ducts 40, 42, 41, 29, 26 and the pipeline 27.

Figure 2:
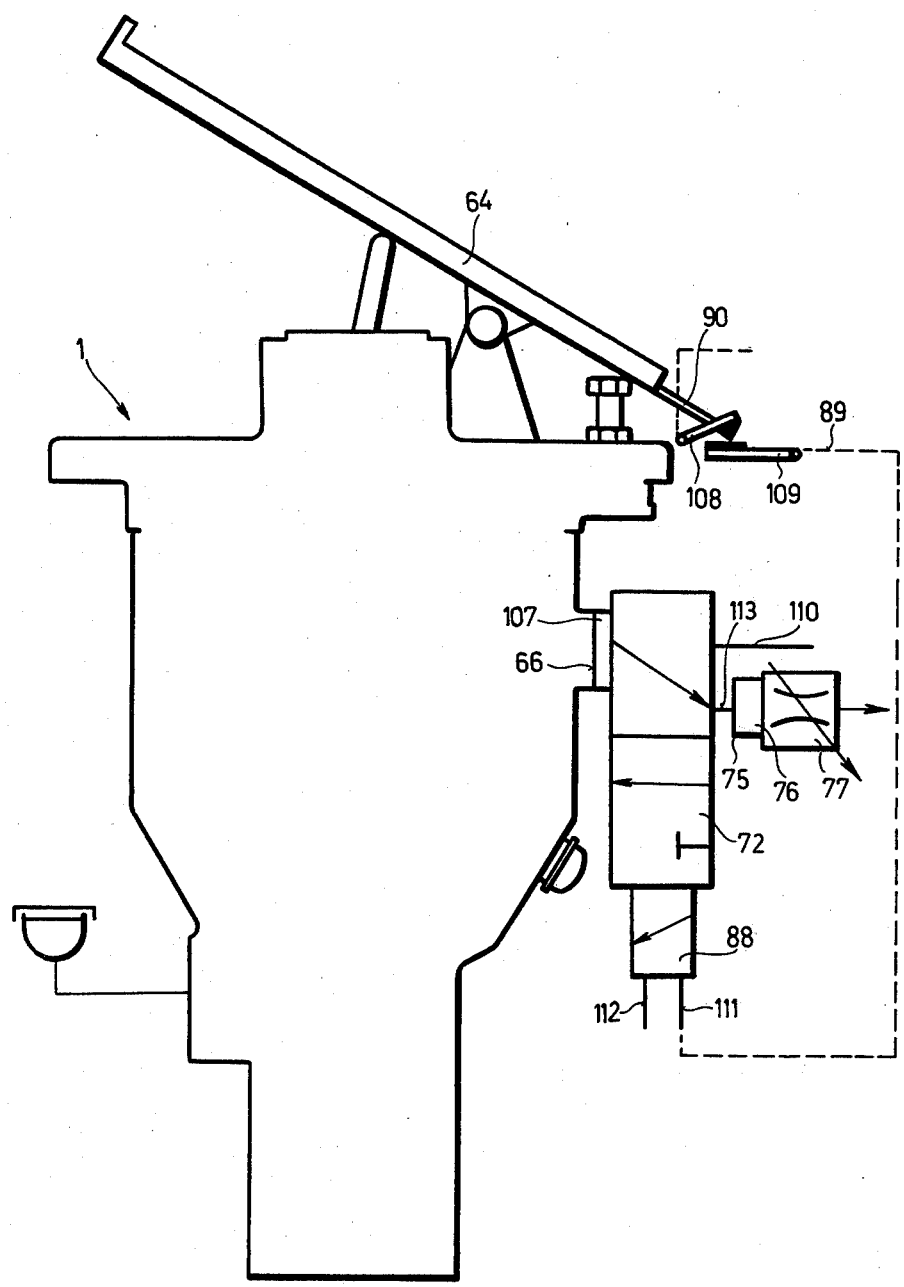
FIG. 2 shows the actuating device according to to invention as illustrated in FIG. 1, incorporating the electro-pneumatic valve and the blow-off unit.

FIG. 2 illustrates an embodiment of the hydro-pneumatic operating device as illustrated in FIG. 1 incorporating an electro-magnetic valve 72 and a blow-off unit 75. Here the electro-pneumatic two-position valve 72 is connected by means of a working-connection 107 to the pneumatic connection 66. In the rest position there is a continuous connection between the pneumatic connection 66 and blow-off unit 75, and a feeding connection 110 is in a closed state. In the operative position of the electro-pneumatic valve 72 the feeding connection 110 communicates with the pneumatic connection 66, the path of the pressure air is closed in the direction of the blow-off unit 75. The electro-pneumatic valve 72 has a blow-off duct 113 that is connected to the blow-off unit 75.

In a repeated rest position the pneumatic connection 66 is connected to an expansion space 76 of the blow-off unit 75, which communicates via throttle 77 with the atmosphere.

An electromagnet 88 of the electro-pneumatic valve 72 has electric connections 111 and 112, respectively, the former being connected by means of a wire 89 with a stationary contact 109 of an electric circuit breaker 90.

FIG. 2 illustrates the circuit arrangement of a moving contact 108 and the connection 112 connected to the pedal 64.

The hydro-pneumatic operating device illustrated in FIG. 2 operates similarly to that shown in FIG. 1. The electro-pneumatic valve 72 controls the connection between the pneumatic space 15 and the pressure-medium tank 28 (not illustrated in FIGS. 1 and 2), simultaneously it controls the speed of discharge from the pneumatic space 15. In its rest position the pneumatic valve 72 connects the pneumatic working space 15 with the atmosphere via the connection 66 and the blow-off unit 75.

When changing into the second or higher gears—supposing that the pedal 64 is left in its stationary position—the electro-pneumatic valve 72 moves, under the influence of the actuated electromagnet 88 into the operated position, connects the feeding connection 110 with the pneumatic connection 66 and the pressure-medium flows into the pneumatic working space 15, simultaneously displacing the hydro-pneumatic working piston 20. When the electromagnet 88 returns to its current-free state, the electro-pneumatic valve 72 returns to its rest position, the connection 66 and the pneumatic working space 15, respectively, will be connected to the blow-off unit 75 and now the air flows from the pneumatic working space 15 via the expansion space 76 and the throttle 77—after having undergone a predetermined pressure drop—into the atmosphere, while the hydro-pneumatic working piston 20 again returns to its stationary position.

After actuation of the pedal 64, the operating device operates in a similar manner, as previously described in connection with FIG. 1.

Figure 3:
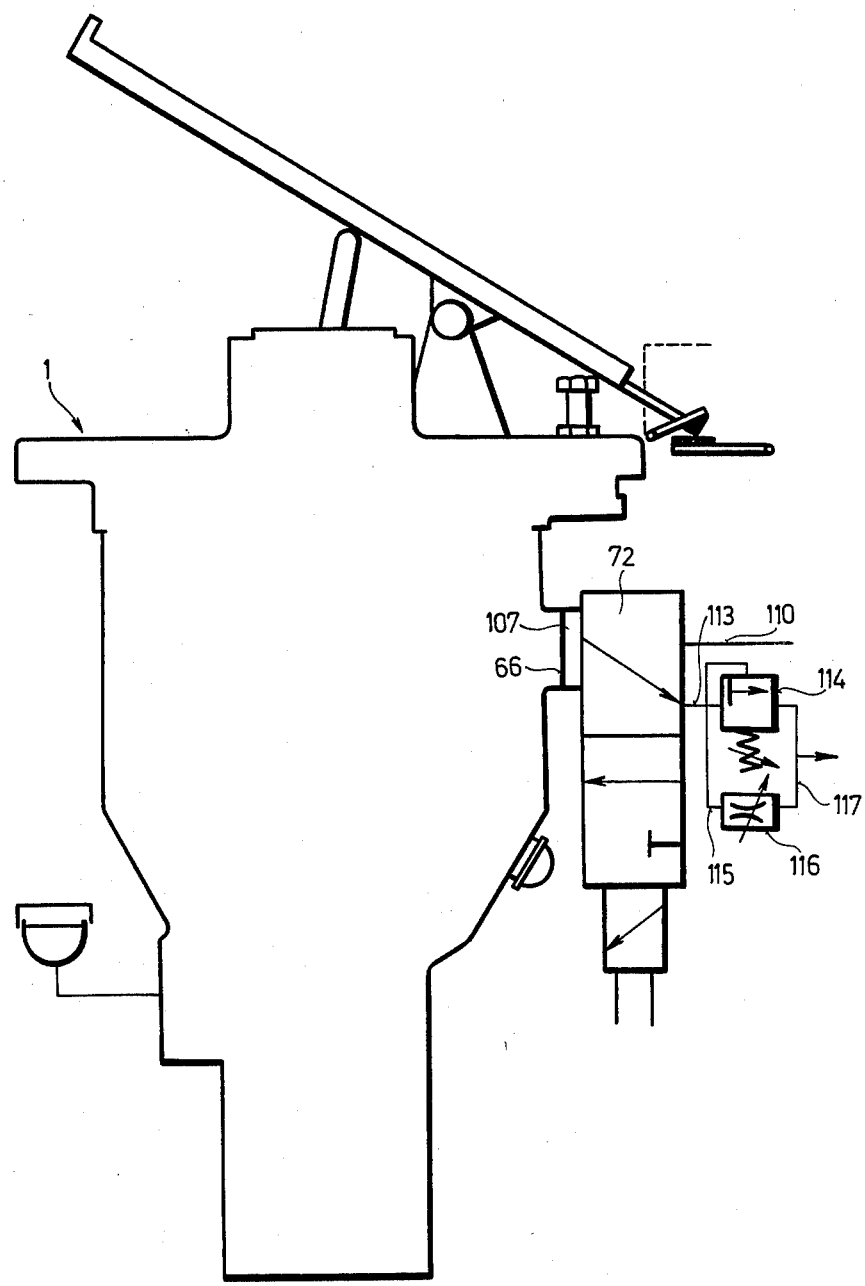
FIG. 3 shows the actuating device according to FIG. 1 incorporating the electro-pneumatic valve and the pressure-limiting blow-off unit.

In FIG. 3 the operating device 1 according to FIG. 1 has been illustrated, incorporating the electro-pneumatic valve 72 and the blow-off unit 75 with a pressure-limiting valve 114.

Here the electro-pneumatic valve 72 is also connected to the pneumatic connection 66 of the hydro-pneumatic operating device 1 by means of the working-connection 107; to the output of the electro-pneumatic valve 72—connected in parallel with the blow-off duct 113—the pressure-limiting valve 114 and a controllable throttle 116 are connected via branch 115; and the throttle 116 and the valve 114 have a common discharge conduit 117.

The embodiment shown in FIG. 3 operates in a similar manner as the operating device 1 described in connection with FIG. 2, the only difference lying in the blow-off unit 75. After having returned from the operated position to the rest position, the electro-pneumatic valve 72 connects the pneumatic working space 15 (here not illustrated) with the blow-off duct 113 through the connection 66. The compressed air flows through the parallel connected pressure-limiting valve 114—opened by the compressed air—and the throtte 116 from the discharge conduit 117 into the open air. As soon as the pressure of the compressed air falls below the opening pressure of the pressure-limiting valve 114, the valve 114 is closed and the compressed air flows through the throttle 116 as long as atmospheric pressure is established in the pneumatic working space 15.

In FIG. 4 the hydro-pneumatic actuating device 1 is illustrated as a part of the total clutch actuating system.

A friction disc 101 of a clutch 102 is sandwiched between flywheel 99 fastened on a shaft 98 of the engine (not illustrated) and by the pressure plate 100 journalled on the flywheel 99. In this case the friction disc 101 is connected to a shaft 106 of the change-speed gear (not shown) by a splined connection. The pressure plate 100 is pressed against the friction disc 101 by springs 103. Pressure arms 104 are journalled on the pressure plate 100 and bear on the one hand against the flywheel 99 and on the other hand, in the manner of two armed levers, against a thrust-bearing 105. A clutch releasing lift-out arm 96 constructed as a two-arm lever and journalled on a pivot shaft 97 (arranged in the non-illustrated housing of the clutch 102) bears on the thrust bearing 105. A piston rod 95 of the piston 94 of a hydraulic working cylinder 93 is linked to the arm 96. The hydraulic working cylinder 93 is connected via a hydraulic conduit 92 to the hydro-pneumatic operating device 1 operatively connected with the pedal 64 mounted thereon.

The hydro-pneumatic operating device 1 is connected via a conduit 70 to an air receiver 69, while this latter is connected via a conduit 68 to an air compressor 67.

The input of the electro-pneumatic valve 72 is connected to a branch 71 of the conduit 70. The electro-pneumatic valve 72 is connected by the pneumatic conduit 73 to the pneumatic connection 66 of the hydro-pneumatic operating device 1. In the rest (neutral) position of the electro-pneumatic valve 72 the blow-off unit 75 is connected to a blow-off conduit 74 communicating with the pneumatic conduit 73. The retarding blow-off unit 75 is provided with expansion space 76 and throttle 77 discharging into the atmosphere.

In the electrical circuit of an electromagnet 88 of the electro-pneumatic valve 72 the following elements are arranged in series connection: an accumulator (battery) 84, one terminal of the electromagnet 88 of the electro-pneumatic valve 72 is connected to the positive pole 85 of the accumulator 84 by a lead 87; the other terminal of the electromagnet 88 is connected to one of the terminals of the electric circuit breaker 90 by a lead 89. One of the terminals of an electric switch 82 is connected to an other terminal of the electric circuit breaker 90 by a lead 91, while the other terminal of the electric switch 82 and the negative pole 86 of the accumulator 84 are grounded.

The electric circuit breaker (limit switch) 90 is disposed in such a way that it is closed when the clutch 102 is in its rest position, and when the pedal 64 is pressed down, the limit switch 90 opens. A handle 79 is linked to a gear shift lever 78 by a pivot hinge 80 provided with a return spring 81. The electric switch 82 is arranged in the pivot hinge 80, the moving contact 83 of which is fixed in the pivot hinge 80.

When the handle 79 is in its rest (neutral) position, the electric switch 82 is in its open position. When changing gears by hand, the handle 79 rotates around the pivot hinge 80 due to the manual force exerted upon it and closes the electric switch 82, whereby the electro-pneumatic valve 72 becomes operational. When the manual force ceases, the handle 79 of the gear shift lever 78 is restored to the neutral (middle) position and opens the electric switch 82.

The device shown in FIG. 3 operates as follows:

To start the motor-vehicle, when stationary, the driver has to operate the clutch 102 by means of the foot pedal 64. When the pedal 64 is pressed down, the limit switch 90 breaks the electric circuit and disables the hydro-pneumatic operating device 1. Thereafter, both the clutch 102 and the gear change are exclusively manually operated. The driver releases slowly the pedal 64 and causes the slip of the clutch 102, thus starting the vehicle.

Upon depression of the pedal 64, the hydraulic fluid pumped by the hydro-pneumatic operating device 1 displaces the piston 94, releasing thus the clutch 102 through the piston rod 95 which swings arm 96 and then the driver controls the closing process by releasing the pedal.

In vehicles which are in motion and when shifting into the second or further gears, the automatic operating device 1 may be put into operation, in this case the pedal 64 of the clutch must be kept in its rest position.

In the course of operation of the automatic clutch-system, change in speed takes place, as follows:

The handle 79 of the gear shift lever 78 turns around the pivot hinge 80 under the influence of the force exerted by the driver's hand, the electric switch 82 is closed, simultaneously the circuit of the electromagnet 88 of the electro-pneumatic valve 72 is closed. In the operated position and electrically actuated, the electro-pneumatic valve 72 establishes a connection between the conduits 71 and 73, while the compressed air activates the hydro-pneumatic operating device 1.

When releasing the handle 79, the circuit is broken, the electro-pneumatic valve 72 is restored to its rest position and separates the conduit 71 from the conduit 73 and connects the latter with the blow-off unit 75 via the blow-off duct 74; through the expansion chamber 76 and the throttle 77 the compressed air is discharged from the blow-off unit 75. The blow-off unit controls the closing speed of the clutch 102, i.e. the duration of slip.

Compressed air flows from the pneumatic pressure space 15 of the hydro-pneumatic operating device 1 into the expansion chamber 76, and from here it flows via the throttle 77 into the free atmosphere. The expansion chamber 76, the throttle 77—which is adjustable—are chosen or co-ordinated in such a manner, that closure of the clutch 102 takes place gradually by slipping, while the driver is "treading gradually on the gas".

The quality of the function of the device 1 fundamentally depends on the characteristics of the blow-off unit 75, which should be harmonized with those of the clutch 102. The air pressure in the pneumatic pressure space 15 of the hydro-pneumatic operating device 1 decreases in two stages. In the first stage, the characteristics of the closing spring 103 of the clutch 102 predominate. It regulates the closure of the clutch 102 by opening the pneumatic pressure space 15 to the expansion space 76.

The volume of the expansion space 76 is chosen such that at the final expansion pressure the pressure plate 100 closes only to the slip position. The second phase is slipping, when the decrease in pressure is characterised by an exponential curve, during which compressed air flows from the expansion space 76 via the throttle 77 into the free atmosphere, and atmospheric pressure is gradually reached in the blow-off system 75.

The advantage of this arrangement is that it ensures a fairly gentle closing process, and has no moving parts which might cause trouble. However, the expansion chamber 76 and the throttle valve 77 must be designed specially to suit each individual type of clutch.

We claim:

1. In a hydro-pneumatic operating device comprising a cylinder block, a hydraulic working cylinder in the cylinder block connected to a pressure-medium and having a hydraulic piston of a hydro-pneumatic piston, and a pneumatic servo-valve unit having a path-control actuated by an external operating element which cooperates with a first pneumatic servo-piston of said hydro-pneumatic piston; the improvement comprising, on the end face of a second pneumatic servo-piston (14) opposite to a pneumatic servo-chamber (11), a supporting surface (19) adapted to contact a surface (118) on said first pneumatic servo-piston (20a) of the hydro-pneumatic piston (20); the side of the first pneumatic servo-piston (20a) opposite the second pneumatic servo-piston (14) confining a blow-off chamber (22); a cylinder section (13) of a pneumatic working chamber (15) enclosed by the hydro-pneumatic piston (20) and the second pneumatic servo-piston (14) having a connection (66) for pressure medium; the hydro-pneumatic piston (20) having a duct (46) leading to said blow-off chamber (22), said blow-off chamber (22) having a blow-off unit (47) discharging to the free atmosphere; an axial bore (51) through said hydro-pneumatic piston (20) leading to said duct (46), a shaft (50) in said bore, said shaft (50) having a longitudinal through-channel (49) communicating with a blow-off chamber (119) of the path controlling servo-valve unit, and in which in an axial through-bore (120) of the hydro-pneumatic piston (20), there is disposed a sealed, axially displaceable piston-insert (44), the extreme position of which is limited by a buffer element (53) in the hydro-pneumatic piston (20), a spring (52) between the piston-insert (44) and the hydro-pneumatic piston (20) which presses the piston-insert (44) toward the buffer element (53), said shaft (50) of the blow-off unit of the servo-valve being disposed in a slidably telescopic and sealed manner in the bore (51) of the piston-insert (44), said bore (51) of the piston-insert (44) continuously communicating through a duct (45) with said duct (46) leading into the blow-off chamber (22) of the second pneumatic servo-piston (14), a compression spring (21) between the hydro-pneumatic piston (20) and an end face of the cylinder block (31), the cylinder block (31) having a feed liquid connection which is connected to a duct (41) of the hydro-pneumatic piston (20) and to a conduit (27) which leads to a fluid tank (28), said duct (41) being connected to a fluid-duct (40) in said piston-insert (44), a valve seat (38) at the end of the feed-duct (40) leading to a hydraulic working chamber (33), and a checkvalve (35) closing in the direction of the fluid-duct (40) and engageable with said valve seat (38).

2. In a hydro-pneumatic operating device comprising a cylinder block, a hydraulic working cylinder in the cylinder block connected to a pressure-medium and having a hydraulic piston of a hydro-pneumatic piston, and a pneumatic servo-valve unit having a path-control actuated by an external operating element which cooperates with a first pneumatic servo-piston of said hydro-pneumatic piston; the improvement comprising, on the end face of a second pneumatic servo-piston (14) opposite to a pneumatic servo-chamber (11), a supporting surface (19) adapted to contact a surface (118) on said first pneumatic servo-piston (20a) of the hydro-pneumatic piston (20); the side of the first pneumatic servo-piston (20a) opposite the second pneumatic servo-piston (14) confining a blow-off chamber (22); a cylinder section (13) of a pneumatic working chamber (15) enclosed by the hydro-pneumatic piston (20) and the second pneumatic servo-piston (14) having a connection (66) for pressure medium; the hydro-pneumatic piston (20) having a duct (46) leading to said blow-off chamber (22), said blow-off chamber (22) having a blow-off unit (47) discharging to the free atmosphere; an axial bore (51) through said hydro-pneumatic piston (20) leading to said duct (46), a shaft (50) in said bore, said shaft (50) having a longitudinal through-channel (49) communicating with a blow-off chamber (119) of the path controlling servo-valve unit, and in which a valve-piston (4) forming the housing of the servo-valve unit is disposed in a sealed and slidably displaceable manner both in the second pneumatic servo-piston (14) and in a cover (9) of the cylinder block (31) and an outer actuating element (63) bears against a closing plug (2) thereof, the inner space (8) of the valve piston (4) continuously communicates through a duct (5) with a duct (65) leading to a connection for pressure-medium in said cover (9), an inner air chamber (98) of the valve-piston (4) is separated from a distribution chamber (56) by means of a movable ring-valve-seat (60) and a double-valve (61) fitted into said ring-valve-seat, a compression spring (6, 62) between the closing plug (2) and the ring-valve-seat (60) as well as the double-valve (61); pins (54) extending through the valve-piston (4), a blow-off valve-seat (58) slidably disposed in a sealed manner in the valve-piston (4) and bearing against said pins (54), one of the end faces of the double-valve (61) fitting on said valve-seat (58), a compression spring (59) between the blow-off valve-seat (58) and the ring-valve-seat (60), said distribution chamber (56) of the valve-piston (4) being continuously in communication with said pneumatic servo-chamber (11) between the second pneumatic servo-piston (14) and the cover (9) through a duct (57), a duct (58a) of the blow-off valve-seat (58) continuously communicating with a blow-off chamber (119) of the valve-piston (4).

* * * * *